United States Patent [19]

Yokoo et al.

[11] 3,873,398

[45] Mar. 25, 1975

[54] PLY-BAND BUILDING APPARATUS

[75] Inventors: Masasuke Yokoo; Masayoshi Suzuki, both of Tokyo; Daitetsu Meguro, Sayama; Shuichi Imai, Tokyo, all of Japan

[73] Assignee: Bridgestone Tire Company Limited, Tokyo, Japan

[22] Filed: Apr. 4, 1973

[21] Appl. No.: 347,915

[30] Foreign Application Priority Data

Apr. 11, 1972 Japan.............................. 47-36187

[52] U.S. Cl................................ 156/417, 156/133
[51] Int. Cl... B29h 17/14, B29h 17/18, B29h 17/20
[58] Field of Search........... 156/110, 117, 123, 124, 156/128, 128 I, 131–133, 394, 414–421

[56] References Cited
UNITED STATES PATENTS 2,628,652  2/1953  Orr ..................................... 156/128
3,051,220  8/1962  Ewing et al. ......................... 156/128
3,237,199  2/1966  Brey..................................... 156/128

*Primary Examiner*—Clifton B. Cosby
*Assistant Examiner*—John E. Kittle

[57] ABSTRACT

Herein disclosed is a ply-band building apparatus which generally includes a main rotary shaft journaled on a fixed base, a ply-band building drum constituted by a plurality of arcuate segments collectively defining the drum surface thereof and a mechanism mounting the arcuate segments on the rotary shaft in such a manner as to permit the arcuate segments simultaneously and radially move thereby to vary the diameter of the drum surface, and drum diameter control means engaged with the mechanism for actuating the mechanism so as to permit the ply-band building drum to be in one of a maximum expanded state, an intermediate operable state and a minimum retracted state.

4 Claims, 1 Drawing Figure

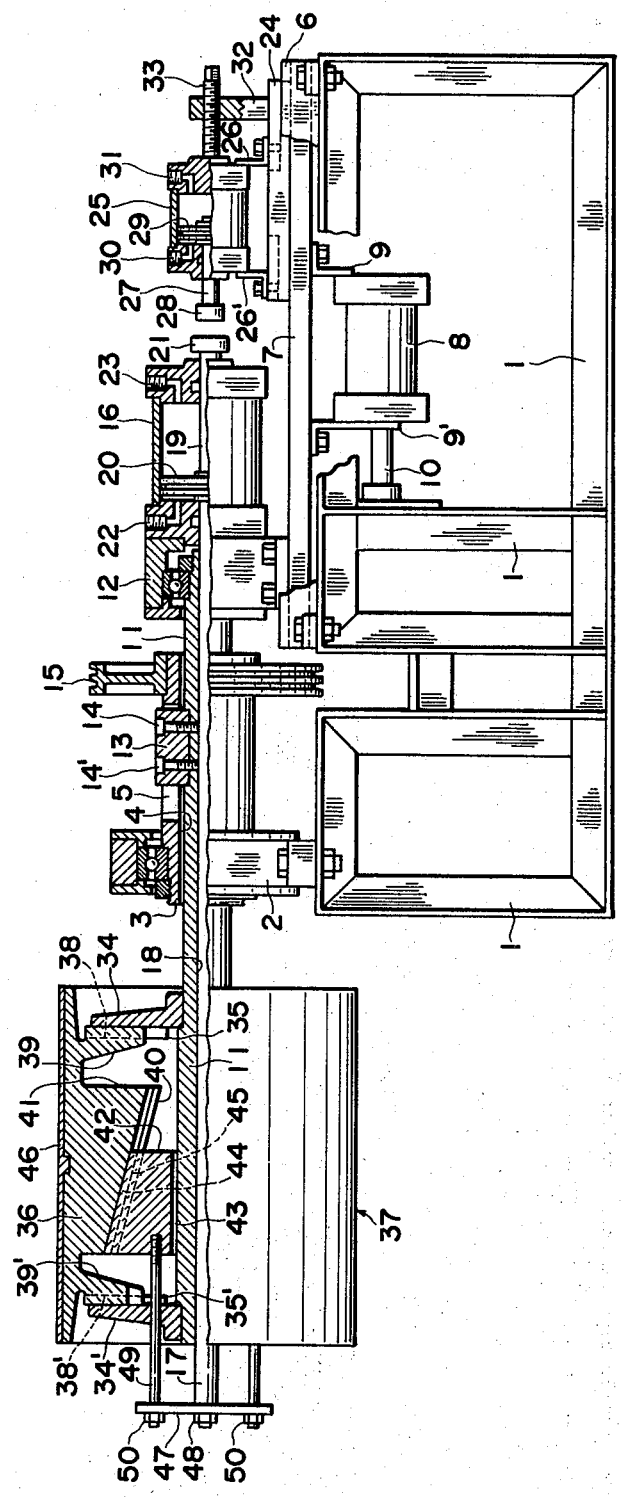

PLY-BAND BUILDING APPARATUS

This invention relates to the art of pneumatic tire manufacture and in particular is concerned with a new and improved type of ply-band building apparatus for making a ply-band which is a basic component of a green tire.

In the art of pneumatic tire manufacture, it is usual to fabricate a ply-band before the step for making a green tire. A ply-band building apparatus generally includes a ply-band building drum which is mounted on a rotary shaft supported by a fixed base structure. The rotary shaft is connected through a suitable linkage to a prime mover such as an electric motor so that the ply-band building drum can be desiredly rotated. In order to fabricate a ply-band, the operator first fixes one end of a ply cord onto the periphery of the ply-band building drum and then permits the ply-band building drum to rotate while regulating the tension applied to the ply cord, thereby to wind up the ply cord on the periphery of the building drum. A plurality of ply cords are one after another wound up on the building drum through the same procedure in such a manner that the ply cords overlie one another but are slightly axially shifted from one another. The operator, thereafter, stitches the ply cord overlying one another by means of a suitable stitching machine so as to form the ply cords into a ply-band. Then, the operator reduces the diameter of the building drum from a maximum operable diameter to a minimum diameter and then removes the resultant ply-band from the building drum.

The thus formed ply band is, however, not fully satisfactory in its quality and uniformity because of an appreciable amount of air remained between the constituent ply cords and a number of creases or slacks of the ply cords. Such unsatisfactory ply-band causes to degrade the quality and performance of the resultant tire.

It is accordingly a principal object of the present invention to provide a new and improved ply-Band building apparatus which can fabricate a ply-band of high quality.

It is another object of the present invention to provide a new and improved ply-band building apparatus which can produce a ply-band of high quality without stitching for removing air captured in the ply-band and eliminating creases or slacks of the constituent ply cords of the ply-band.

It is a further object of the present invention to provide a ply-band building apparatus which lessen the load of the operator.

According to the present invention, the above objects are achieved by a ply-band building apparatus which comprises a fixed base structure, a main rotary shaft journaled on the fixed base structure, a ply-band building drum including a plurality of arcuate segments collectively defining the drum surface and a mechanism mounting the arcuate segments on the rotary shaft for radially simultaneously moving the arcuate segments so as to vary the diameter of the drum surface, and drum diameter control means engaged with the mechanism for actuating the mechanism so as to premit the ply-band building drum to be in one of a maximum expanded state, an intermediate operable state and a minimum retracted state.

A preferred embodiment of the ply-band building apparatus according to the present invention is illustrated in the accompanying drawing, which is a longitudinal sectional view of the embodiment.

Referring now to the drawing, a ply-band building apparatus of the present invention comprises a fixed frame or base 1, a radial or journal bearing 2 fixedly mounted on the fixed frame 1, a tubular sleeve 3 bearing at one end portion thereof on the bush of the bearing 2. The sleeve 3 has a hollow 4 extending axially thereof and a closed elongated slot 5 communicating with the hollow 4 and extending axially thereof at the peripheral wall thereof. A guide rail 6 is firmly fixed on the fixed frame 1, which guides a slide or shift frame 7 in the axial direction of the sleeve 3. A fluid pressure operated cylinder assembly 8 is mounted through a pair of bracket 9 and 9' on the lower surface of the shift frame 7. The cylinder assembly 8 has a piston rod 10 the terminal end of which is firmly fixed to the frame 1 so that the shift frame 7 is reciprocally shifted in the axial direction of the sleeve 8 in accordance with the reciprocal movement of the piston rod 10. A rotary main shaft 11 is slidably inserted into the hollow 4 of the sleeve 3 and journaled at one end thereof on a journal or radial bearing 12 which is firmly fixed on the upper surface of the slide frame 7. A key member 13 is so fastened on the peripheral wall of the main shaft 11 by means of a suitable means such as a pair of bolts 14 and 14' as to couple with the closed elongated slot 5 of the sleeve 3. A driving pulley 15 is coupled on the other end of the sleeve 3, which is adapted to be rotated through, for example, a pair of loop belts by a suitable prime mover such as an electric motor (not shown). A fluid pressure operated main cylinder assembly 16 is fastened onto the rear side of the bearing 12. The main cylinder assembly 16 includes a cylinder with bottomed both ends and provided at each bottom thereof a port 22 or 23 and a central aperture, a piston 20 slidably accommodated in the cylinder and a piston rod 19 slidably coupled with both the central apertures of the cylinder assembly 16 and carrying thereon the piston 19. The main shaft 11 has a bore 18 extending therethrough. Into the bore 18 is inserted a control rod 17 which is preferably integral with the piston rod 19. The piston 20 is reciprocally moved between both the bottoms in accordance with the fluid pressure applied thereto through the ports 22 and 23. A stop member 21 is mounted on the remaining end of the piston rod 19. A base plate 24 is firmly fixed on the upper surface of the slide frame 7. The base plate 24 carries thereon through a pair of brackets 26 and 26' a fluid pressure operated subsidiary cylinder assembly 25 which includes a cylinder with both the ends thereof being bottomed and provided at one bottom thereof with a port 31 and at the other bottom a part 30 and a central aperture, a piston 29 slidably accommodated in the cylinder, and a piston rod 27 slidably inserted into the central aperture and connected to the piston 29. A stop member 28 is mounted on the remaining end of the piston rod 27. The subsidiary cylinder assembly 25 is so positioned that the stop member 28 abuts with the stop member 21 when the piston 20 of the main cylinder assembly 16 is in an intermediate position and the piston 29 is in the leftmost position. The piston 29 reciprocates through the cylinder in accordance with the fluid pressure applied thereto by way of the ports 30 and 31. The subsidiary cylinder assembly 25 is made slidable on the base plate 24 in the axial direction of the sleeve 3. An adjust means for adjusting the position of the subsidiary cylinder assembly 25 is provided, which includes a support member 32 secured on the base plate 24 and an adjusting screw 33 supported by the support member 32. This adjust means may be, of course, omitted, if desired.

A ply-band building drum 37 is mounted on the main rotary shaft 11, which includes a plurality of arcuate segments 36 collectively defining the drum surface thereof and a mechanism mounting the arcuate segments 36 on the main rotary shaft 11 in such a manner that the arcuate segments are simultaneously and radially movable thereby to cause to vary the diameter of the drum surface. The mechanism includes a pair of guide flange members 34 and 34' mounted on the main rotary shaft 11 in face-to-face and axially spaced relation with respect to each other. The guide flange members 34 and 34' respectively have elongated projections 35 and 35' radially extending in circumferentially equidistantly spaced relation with respect to each other on the side walls thereof facing to each other. Each arcuate segments 36 has a pair of side projections 39 and 39' which respectively have grooves 38 and 38' extending in the radial direction of the drum. The arcuate segments 36 are radially movably guided by way of the grooves 38 and 38' by the projections 35 and 35'. Each arcuate segment has a central projection 41 interposed between the side projections 39 and 39' and having an inclined arcuate radial inner surface 40. The mechanism further includes a conical slide member 42 which is slidably mounted through a central bore 43 formed therein on a portion of the main rotary shaft 11 between the guide flange members 34 and 34'. The conical slide member 42 has on the peripheral wall a plurality of projections 45 each of which is coupled with a dovetail groove 44 formed on the inner inclined wall 40 of each arcuate segment 36. All the arcuate segments 36 are covered with an elastic and resilient annular cover sheet 46. A circular plate 47 is firmly fixed to the remaining end of the control rod 17 by means of a nut 48. One or more connecting rods 49 are fastened at one ends thereof to the circular plate 47 by means of nuts 50, slidably inserted into apertures formed in the flange member 34' and connected at the other ends to the conical slide member 42. Accordingly, the conical slide member 42 axially moves in accordance with the axial movement of the control rod 17 thereby to cause the diameter of the drum surface to vary.

The operation of the above-stated ply-band building apparatus will be explained hereinbelow.

When, as shown in the drawing, the conical slide member 42 is in the leftmost position, the ply-band building drum 37 is in a minimum retracted state. In the ply-band fabricating process, the pressurized liquid is first introduced through the port 31 into the cylinder of the cylinder assembly 25, while the port 30 is exhausted, thereby to urge the piston 29 up to the leftmost position as shown in the drawing. Next, or at the same time, the fluid pressure is delivered through the port 22 to the cylinder of the cylinder assembly 16 while the port 23 is exhausted thereby to permit the piston 20 to move from the leftmost position to an intermediate position until the stop member 21 abuts onto the stop member 28. At this instant, the control rod 17 also moves to the right and the conical slide member 42 concurrently slides on the rotary shaft 11 to the right so that the arcuate segments 36 radially outwardly slide on the flange members 34 and 34' until the building drum 37 becomes in an intermediate operable state. Thereupon, one terminal of a ply cord of a desired length is fixed to a suitable portion of the cover sheet 46. While the tension applied to the ply cord is suitably regulated, the building drum 37 is intermittently rotated by way of the driving connection through the agency of the key member 13 by rotating the pulley 15. Upon completion of the wind up of the ply cord, another ply cord of a desired length may be applied to the building drum. In this instance, the building drum 37 may be axially shifted through a desired distance by shifting the slide frame 7 on the guide rail 6 through the actuation of the fluid pressure operated cylinder assembly 8, whereby the subsequently applied ply cord is wound up on the initial ply cord in such a manner that the former ply cord partly overlies the latter. The above-stated procedure may be repeated so as to successively wind up a desired number of ply cords on the building drum 37 in a desired arrangement. In this instance, the building drum 37 is desiredly shifted by the axial movement of the main rotary shaft 11 due to the reciprocal movement of the piston rod 10 of the cylinder assembly 8. It is now to be understood that the key member 13 moves along the closed slot 5 when the main rotary shaft 11 axially shifts. It is also to be understood that the control rod 17, the circular plate 47, the connecting rods 49, the conical slide member 42, etc. rotate together with the building drum 37.

When the desired number of ply cord are wound up on the building drum 37, the fluid pressure applied to the port 22 of the cylinder assembly 16 is maintained and, on the other hand, the fluid pressure applied to the port 31 is removed, whereby the piston rod 19 and the control rod 17 are urged up to the rightmost position. At this instant, the conical slide member 42 also moves to the rightmost position thereby to cause the building drum 37 to be in a maximum expanded state. When the building drum 37 is in the maximum expanded state, the ply cords constituting a ply-band are so sufficiently tensed that a small amount of air captured between the ply cords and creases or slacks of the ply cords are removed thereby to satisfactorily adhere to one another. The thus formed ply-band may further undergo a manual or automatic stitching, if preferred, in order to completely remove the captured air. Thereafter, the fluid pressure is applied to the ports 23 and 31 while the ports 22 and 30 are allowed to be exhausted so as to make the control rod 17 and the conical slide member 42 to shift up to the left-most position, whereby the ply-band building drum 37 is in the minimum retracted state as shown in the drawing. The ply-band formed on the building drum 37 can be readily separated from the building drum 37.

It is now apparent from the above description that the ply-band building drum of the ply-band building apparatus according to the invention are so controlled as to be in one of the minimum retracted state, the intermediate operable state and the maximum expanded state which are respectively corresponding to the steps of separating the resultant ply-band from the building drum, of tensing the ply-band so as to remove the captured air and the creases or slacks of the constituent ply cords with a view to permitting the ply cords to sufficiently adhere to one another, and of successively winding up the ply cords on the building drum.

It should be now appreciated that the ply-band building apparatus according to the present invention can produce a ply-band of extremely high quality since the building apparatus can completely remove the remaining air captured between the constituent ply cords and the creases or slacks of the ply cords. Furthermore, the ply-band building apparatus of the invention makes possible to desiredly control the arrangement of the constituent ply cords because the axial position of the building drum can be desiredly controlled.

While there has been described a preferred embodiment of the present invention it will be understood that various modifications and rearrangements may be made without departing from the scope and spirit of the invention, as defined in the appended claims.

What is claimed is:

1. A ply-band building apparatus, which comprises:
a fixed frame structure;
a rotary shaft journaled on said fixed frame structure and having a bore axially extending therethrough;
a ply-band building drum including a plurality of arcuate segments collectively defining the drum surface thereof, each arcuate segment having a central projection at the radially inner wall thereof, a pair of guide flange members fastened on the periphery of said rotary shaft in face-to-face relation with each other, a conical hollow slide member interposed between said guide flange members to be slidably mounted through the hollow thereof on said rotary shaft with the peripheral surface of said conical hollow slide member slidably coupled with the radially inner wall of said central projection of each arcuate segment inclined from the periphery of said each arcuate segment through the same inclination as the peripheral surface of the conical hollow slide member in the axial direction of the building drum, and a pair of side projections radially inwardly extending and respectively radially slidably mounted on said guide flange members, so that said arcuate segments radially simultaneously move in accordance with axial movement of said conical hollow slide member;
drum control means including a control rod slidably inserted into said bore of the rotary shaft and connected at one end thereof to said conical hollow slide member, a fluid pressure operated main cylinder assembly having a cylinder bottomed at the both ends thereof and provided at each bottom thereof with a port and a central aperture, a piston slidably accommodated in said cylinder and a piston rod slidably inserted into the central apertures and connected to said piston, one end of said piston rod being connected to said control rod, and a fluid pressure operated subsidiary cylinder assembly having a cylinder bottomed at the both ends thereof and provided at one bottom thereof with a central aperture and a port and at the other bottom thereof with a port, a piston slidably accommodated in said cylinder and a piston rod connected to said piston and slidably coupled with said aperture, said main and subsidiary cylinder assemblies being so mounted on said frame structure that the other end of said piston rod of said main cylinder assembly and said piston rod of said subsidiary cylinder assembly abut on each other when said piston of the main cylinder assembly be in an intermediate position and said piston of the subsidiary cylinder assembly be in an utmost position nearer to said main cylinder assembly.

2. A ply-band building apparatus as set forth in claim 1, in which said subsidiary cylinder assembly is slidably mounted on said frame structure, and which further comprises means for adjusting the position of said subsidiary cylinder assembly with respect to said main cylinder assembly.

3. A ply-band building apparatus as set forth in claim 1, which further comprises:
shifting means connected to and for shifting said rotary shaft, said fluid pressure operated main cylinder assembly and said fluid pressure operated subsidiary cylinder in the axial direction of said rotary shaft.

4. A ply-band building apparatus as set forth in claim 1, in which said shifting means includes a slide base member slidably mounted on said fixed frame structure and carrying thereon said fluid pressure operated main cylinder assembly and said fluid pressure operated subsidiary cylinder, and a fluid pressure operated cylinder assembly fastened on said slide base member and having a piston rod connected to said fixed frame structure.

* * * * *